United States Patent
Iizawa et al.

(10) Patent No.: US 12,467,505 B2
(45) Date of Patent: Nov. 11, 2025

(54) MAGNETIC ENCODER AND METHOD OF MANUFACTURING MAGNETIC ENCODER

(71) Applicant: NAKANISHI METAL WORKS CO., LTD., Osaka (JP)

(72) Inventors: Yusuke Iizawa, Osaka (JP); Yoshihiro Ito, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 197 days.

(21) Appl. No.: 18/214,056

(22) Filed: Jun. 26, 2023

(65) Prior Publication Data

US 2024/0044375 A1 Feb. 8, 2024

(30) Foreign Application Priority Data

Aug. 8, 2022 (JP) .................. 2022-126365

(51) Int. Cl.
*G01R 33/00* (2006.01)
*F16C 41/00* (2006.01)

(52) U.S. Cl.
CPC ........ *F16C 41/007* (2013.01); *F16C 2326/02* (2013.01); *G01D 2205/26* (2021.05)

(58) Field of Classification Search
CPC ............... F16C 2326/02; F16C 41/007; G01D 2205/26; G01D 5/20; H03F 3/45475; H03K 17/51; H04B 1/04; H04B 2001/045; G01R 31/00; G01R 33/00
See application file for complete search history.

(56) References Cited

U.S. PATENT DOCUMENTS

| | | | |
|---|---|---|---|
| 2016/0033303 A1* | 2/2016 | Harano | G01P 3/443 324/207.25 |
| 2016/0245409 A1 | 8/2016 | Kato | |
| 2019/0084350 A1* | 3/2019 | Nakatsuji | F16C 33/78 |

FOREIGN PATENT DOCUMENTS

| | | | | |
|---|---|---|---|---|
| JP | 2008139162 A | * | 6/2008 | .......... F16C 33/7883 |
| JP | 2016023755 A | * | 2/2016 | .............. G01P 3/487 |
| JP | 6241188 B2 | | 12/2017 | |

* cited by examiner

*Primary Examiner* — Lee E Rodak
*Assistant Examiner* — Taqi R Nasir
(74) *Attorney, Agent, or Firm* — Kratz, Quintos & Hanson, LLP

(57) ABSTRACT

A cylindrical portion of an annular support member has a small-diameter portion press-fitted to an inner ring of a bearing, and a large-diameter portion formed by enlarging a part of the cylindrical portion, which is closer to an inboard side than the small-diameter portion. An annular magnet member has an inner-diameter side recessed portion formed by depressing, toward an outboard side, a radially inner part of a surface, in an inboard side, of the annular magnet member, and a wraparound portion that wraps around the annular support member toward the outboard side to a stepped portion between the small-diameter portion and the large-diameter portion. An inner peripheral surface of the wraparound portion protrudes radially inward more than an inner peripheral surface of the small-diameter portion. An inner peripheral surface of the inner-diameter side recessed portion has a gate mark of an inner-diameter side disk gate.

2 Claims, 15 Drawing Sheets

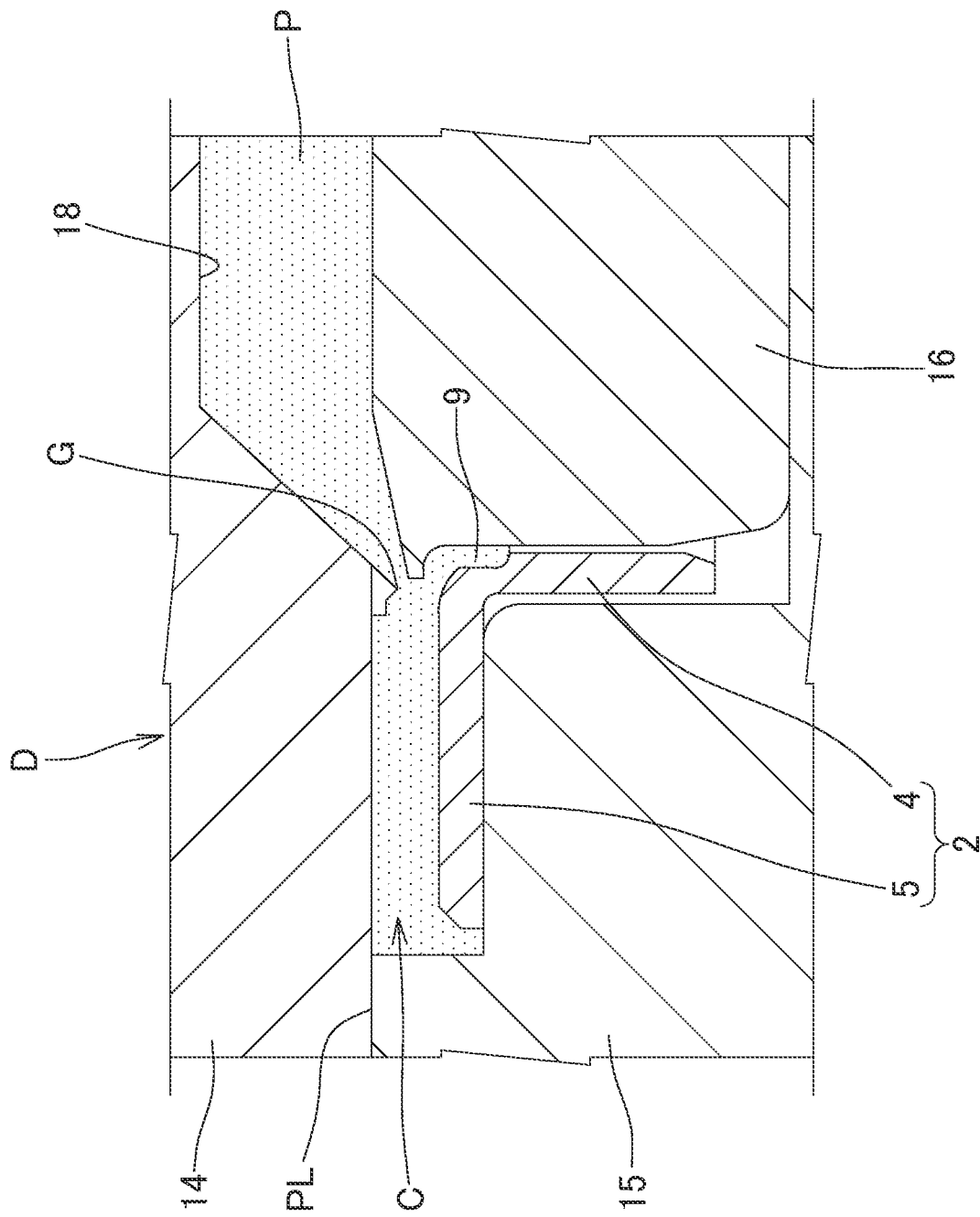

MAGNETIC ENCODER AND METHOD OF MANUFACTURING MAGNETIC ENCODER

FIELD OF THE INVENTION

The present invention relates to a magnetic encoder for use in a wheel support bearing device of an automobile.

BACKGROUND

A magnetic encoder device used for detecting a rotational speed (the number of rotations) of a rotation body includes a magnetic encoder and a magnetic sensor that detects rotation of the magnetic encoder. The magnetic encoder is attached to the rotation body, and the magnetic sensor is attached to a non-rotating body.

The magnetic encoder used in a wheel support bearing device (hub unit bearing) of an automobile includes an annular support member (slinger) and an annular magnet member. The magnetic sensor used in the wheel support bearing device is attached to an outer ring of a bearing and faces the annular magnet member in an axial direction.

The annular support member is made of metal and includes a cylindrical portion that fits on the exterior of an inner ring of the bearing, and an outward flange portion that extends radially outward from one end of the cylindrical portion. The annular magnet member is magnetized into multiple poles with N poles and S poles arranged at regular intervals in a circumferential direction, and is attached to the outward flange portion of the annular support member.

The wheel support bearing device is used in a state where the cylindrical portion of the annular support member is fitted to the inner ring. Thus, if moisture enters a fitting portion between the cylindrical portion and the inner ring, an outer peripheral surface of the inner ring made of iron corrodes In order to prevent the moisture from entering the fitting portion, an inner peripheral surface of the cylindrical portion of the annular support member is formed into a stepped cylindrical surface, and the annular magnet member is made to extend radially inward and is brought into contact with the stepped portion of the cylindrical portion (for example, a stepped portion 27 of Patent Literature (PTL) 1), so as to allow an inner peripheral surface of the annular magnet member to have an interference for the outer peripheral surface of the inner ring (see PTLS 1 and 2, for example).

In the magnetic encoder of PTL 1, an inner diameter ($\varphi d2$) of the inner peripheral surface (a cylindrical surface portion 28) of the annular magnet member is larger than an inner diameter ($\varphi d1$) of a part (a small-diameter portion 26) of the cylindrical portion of the annular support member, which is fitted to the inner ring, and is smaller than an outer diameter ($\varphi D$) of the inner ring ($\varphi d1 < \varphi d2 < \varphi D$, see FIG. 2 of PTL 1). In a magnetic encoder of PTL 2, an inner diameter of an inner peripheral surface of the annular magnet member (the inner peripheral surface of a protruding portion 22) is smaller than an inner diameter of a part (the inner diameter of an inner peripheral surface 20e) of the cylindrical portion of the annular support member, which is fitted to the inner ring (see a projection length t1 in FIG. 2 of PTL 2).

CITATION LIST

Patent Literature

PTL 1: Japanese Patent No. 6241188
PTL 2: Japanese Unexamined Patent Application Publication No. 2016-23755

SUMMARY

Technical Problem

In a structure of the magnetic encoder disclosed in PTL 1, due to variations in dimensional accuracy of the annular support member and the inner ring, the interference at the fitting portion between the part (the small-diameter portion 26) of the cylindrical portion, which is fitted to the inner ring, and the inner ring fluctuates in a state where the cylindrical portion of the annular support member is press-fitted to the inner ring. Accordingly, a contact state between the inner peripheral surface (cylindrical surface portion 28) of the annular magnet member and the outer peripheral surface of the inner ring fluctuates, and it is difficult to control the contact state within a predetermined range. Therefore, in the structure of the magnetic encoder of PTL 1, performance of preventing moisture from entering the fitting portion may be lowered, and moisture may enter the fitting portion, depending on the contact state.

Meanwhile, in a structure of the magnetic encoder of PTL 2, an inner diameter of the inner peripheral surface (the inner peripheral surface of a projecting portion 22) of the annular magnet member is smaller than the inner diameter of the part (the inner diameter of the inner peripheral surface 20e) of the cylindrical portion of the annular magnet member, which is fitted to the inner ring, in a state where the cylindrical portion of the annular support member is press-fitted to the inner ring. Accordingly, the inner peripheral surface of the annular magnet member is securely press-fitted to the inner ring. Therefore, in the structure of the magnetic encoder of PTL 2, it is conceivable that the performance of preventing moisture from entering the fitting portion between the cylindrical portion of the annular support member and the inner ring is stabilized.

The annular magnet member is manufactured through injection molding, and the inner peripheral surface of the annular magnet member (the inner peripheral surface of the protruding portion 22) is brought into contact with the outer peripheral surface of the inner ring to prevent moisture from entering the fitting portion. Therefore, it is necessary to prevent defects, such as short shots, from occurring in a resin that forms the inner peripheral surface of the annular magnet member.

However, in the structure of the magnetic encoder of PTL 2, when a magnet portion 21, which is the annular magnet member, is formed through the injection molding, a molten resin is unlikely to flow to the thin projecting portion 22 that faces the stepped portion (the position of a boundary line D) of a cylindrical portion 20a of a slinger 20 that is the annular support member, causing a defect likely to occur. If the defect occurs in the inner peripheral surface of the annular magnet member in contact with the outer peripheral surface of the inner ring of the bearing, the performance of preventing moisture from entering the fitting portion between the cylindrical portion of the annular support member and the inner ring may not be maintained.

A purpose of the present invention is to provide a magnetic encoder preventing defects such as short shots from occurring in the inner peripheral surface of an annular magnet member, which is brought into contact with the outer peripheral surface of an inner ring of a bearing, so as to prevent moisture from entering a fitting portion between a cylindrical portion of an annular support member and the inner ring, and also to provide a method of manufacturing such a magnetic encoder.

Solution to Problem

A magnetic encoder according to the present invention is used for a wheel support bearing device of an automobile, and includes an annular support member made of metal and an annular magnet member made of a plastic magnet. The annular support member includes: a cylindrical portion that fits on the exterior of an inner ring of a bearing of the wheel support bearing device, and an outward flange portion extending radially outward from an end portion of the cylindrical portion in an inboard side. The cylindrical portion has a small-diameter portion press-fitted to the inner ring of the bearing, and a large-diameter portion formed by enlarging a part of the cylindrical portion, which is closer to the inboard side than the small-diameter portion. The annular magnet member is attached to a surface of the outward flange portion in the inboard side. The annular magnet member has an inner-diameter side recessed portion formed by depressing, toward an outboard side, a radially inner part in a surface, in the inboard side, of the annular magnet member, and a wraparound portion that wraps around the annular support member toward the outboard side to a stepped portion between the small-diameter portion and the large-diameter portion of the cylindrical portion. An inner peripheral surface of the wraparound portion, which is press-fitted to the inner ring, protrudes more radially inward than the inner peripheral surface of the small-diameter portion. The inner peripheral surface of the inner-diameter side recessed portion has a gate mark of an inner diameter disk gate.

A method of manufacturing a magnetic encoder, according to the present invention, is the method of manufacturing a magnetic encoder for use in a wheel support bearing device of an automobile. The magnetic encoder includes an annular support member made of metal and an annular magnet member made of a plastic magnet. The annular support member includes a cylindrical portion that fits on the exterior of an inner ring of a bearing of the wheel support bearing device and an outward flange portion extending radially outward from an end portion of the cylindrical portion in an inboard side. The cylindrical portion has a small-diameter portion press-fitted to the inner ring of the bearing, and a large-diameter portion formed by enlarging a part of the cylindrical portion, which is closer to the inboard side than the small-diameter portion. The annular magnet member is attached to a surface of the outward flange portion in the inboard side. The annular magnet member has an inner-diameter side recessed portion formed by depressing, toward an outboard side, a radially inner part in a surface, in the inboard side, of the annular magnet member, and a wraparound portion that wraps around the annular support member toward the outboard side to a stepped portion between the small-diameter portion and the large-diameter portion of the cylindrical portion. An inner peripheral surface of the wraparound portion, which is press-fitted to the inner ring, protrudes more radially inward than the inner peripheral surface of the small-diameter portion. The method of manufacturing a magnetic encoder includes: molding the annular support member by one of (i) pressing and (ii) the pressing and cutting: applying a thermosetting adhesive to a part of or an entire of a joint surface of the molded annular support member with the annular magnet member; opening an injection molding die and setting, in the injection molding die, the annular support member to which the thermosetting adhesive is applied, as an insert work; and closing the injection molding die, and injecting a molten resin in a cavity of the injection molding die from an inner-diameter side disk gate of the injection molding die, which is arranged at a position corresponding to an inner peripheral surface of the inner-diameter side recessed portion of the annular magnet member, to thereby mold the annular magnet member.

Advantageous Effects

In the magnetic encoder according to the present invention, the inner-diameter side recessed portion is provided in a radially inner part in a surface of the annular magnetic member in the inboard side, and the gate mark of the inner-diameter side disk gate is provided in the inner peripheral surface of the Inner-diameter side recessed portion. In the method of manufacturing a magnetic encoder, according to the present invention, the inner-diameter side disk gate for injecting a molten resin in the cavity of the injection molding die upon the injection molding of the annular magnet member is provided at a position corresponding to the inner peripheral surface of the inner-diameter side recessed portion.

In other words, the inner-diameter side disk gate of the injection molding die is positioned near the wraparound portion of the annular magnet member, which wraps around the annular support member toward the outboard side to the stepped portion between the small-diameter portion and the large diameter portion in the cylindrical portion. With this configuration, a molten resin easily flows to the thin wraparound portion from the inner-diameter side disk gate, to thereby stabilize a filling state of the molten resin in the wraparound portion. Therefore, the inner peripheral surface of the wraparound portion, which comes into contact with the outer peripheral surface of the inner ring of the bearing, does not suffer from defects such as short shots.

In the magnetic encoder according to the present invention and a magnetic encoder manufactured by the method of manufacturing a magnetic encoder, according to the present invention, the inner peripheral surface of the wraparound portion of the annular magnetic member, which is press-fitted to the inner ring of the bearing, protrudes more radially inward than the inner peripheral surface of the small-diameter portion of the cylindrical portion of the annular support member. Therefore, the wraparound portion of the annular magnet member is securely press-fitted to the inner ring of the bearing. In addition, the inner peripheral surface of the wraparound portion does not suffer from defects such as short shots, as described above. Therefore, the performance of preventing moisture from entering the fitting portion between the small-diameter portion of the cylindrical portion of the annular support member of the magnetic encoder and the inner ring of the bearing can be reliably maintained.

BRIEF DESCRIPTION OF DRAWINGS

FIG. 15 is a schematic vertical cross-sectional view of an enlarged main part, shows an example of the injection molding die for molding an annular magnet member according to the modified example, and shows a state in which the molten resin is injected into the cavity.

DESCRIPTION OF EMBODIMENTS

Hereinafter, embodiments of the present invention are described in detail with reference to the accompanying drawings. In the description, in a state where a magnetic encoder is attached to a wheel support bearing device of an automobile, a direction parallel to a rotation axis (see a reference sign "O" in FIG. 1) of the bearing device is referred to as an "axial direction", and a direction perpendicular to the rotation axis is referred to as a "radial direction" (see an arrow R in FIG. 1). Regarding the "radial direction", a direction away from the rotation axis is referred to as a "radially outward direction", and a direction approaching the rotation axis O is referred to as a "radially inward direction". A "circumferential direction" is defined with respect to a direction along the rotation axis.

Figure 1:
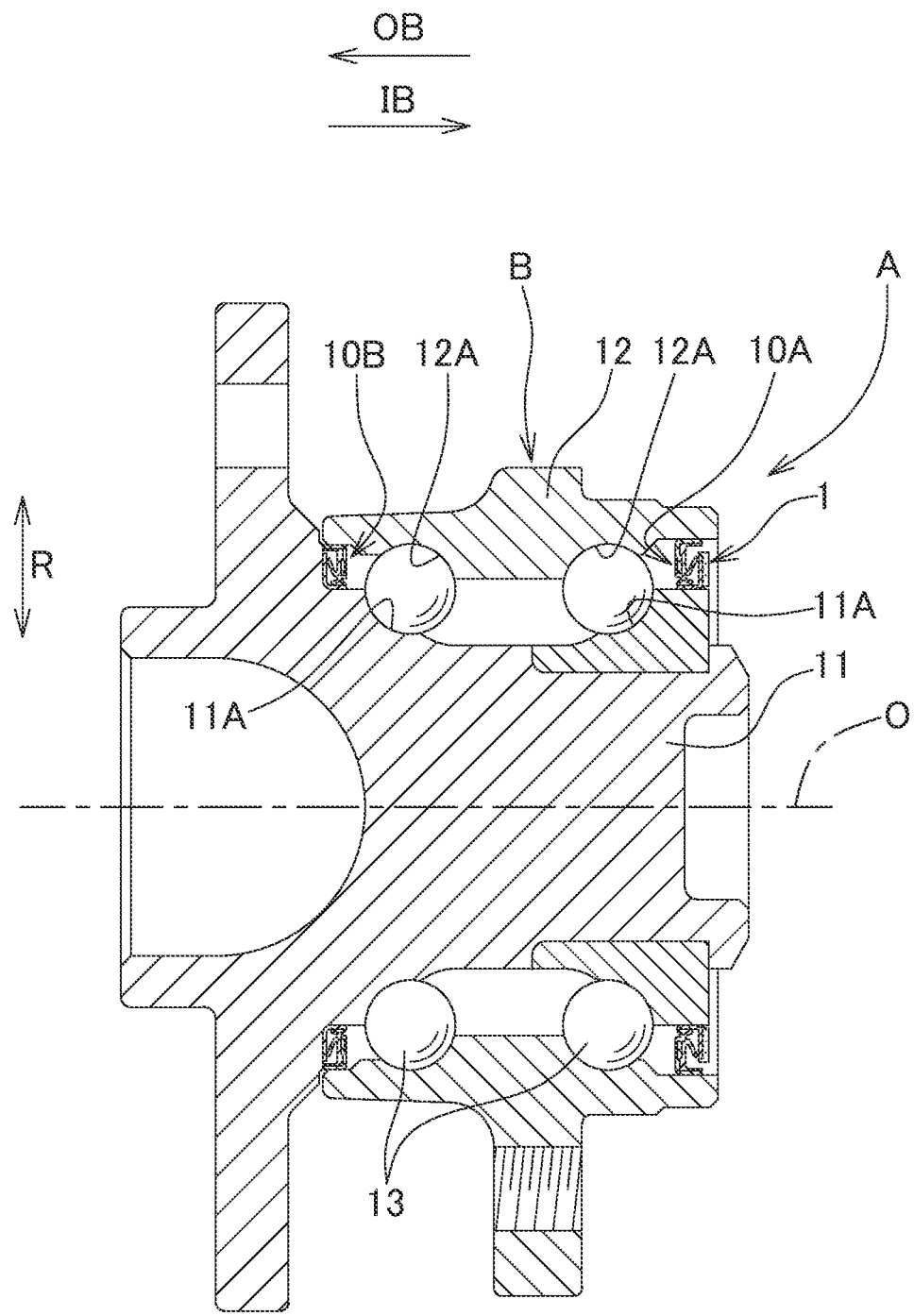
FIG. 1 is a vertical cross-sectional view showing a wheel support bearing device of an automobile, which is provided with a magnetic encoder according to an embodiment of the present invention.

Also, a direction from a body, in an automobile, toward wheels is referred to as "outboard" (see an arrow OB in FIG. 1), and a direction from the wheels toward the body in an automobile is referred to as "inboard" (see an arrow IB in FIG. 1).

<Wheel Support Bearing Device of Automobile>

Figure 2:
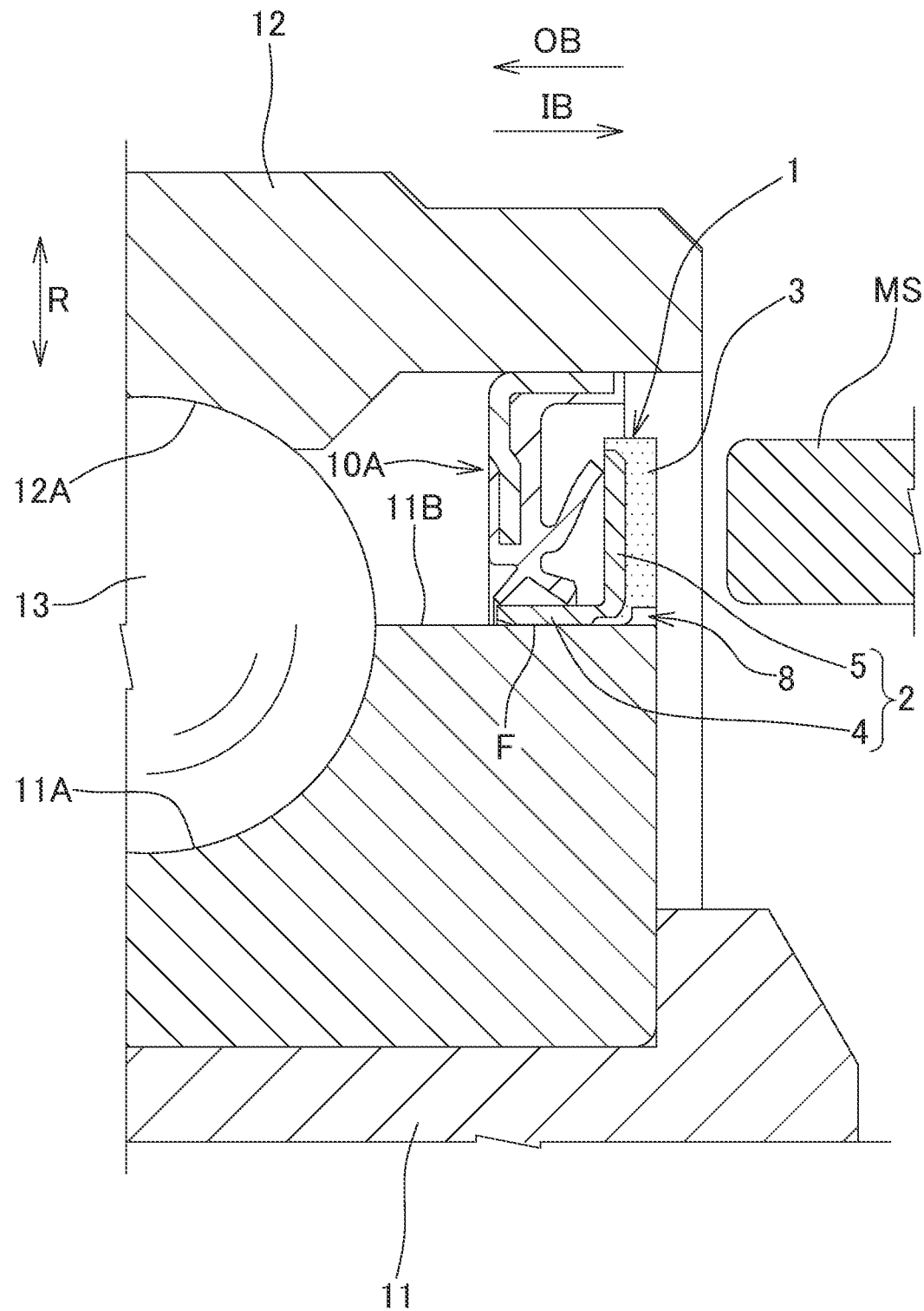
FIG. 2 is a vertical cross-sectional view of an enlarged main part around the magnetic encoder shown in FIG. 1.

As shown in FIGS. 1 and 2, a wheel support bearing device A of an automobile, which is provided with a magnetic encoder 1 according to an embodiment of the present invention, includes; a bearing B in which an inner ring 11 as a wheel hub rotates with respect to an outer ring 12; an axial type magnetic encoder 1; seal members 10A and 10B respectively disposed on an inboard IB side and an outboard OB side of the bearing B; a magnetic sensor MS, and the like. The sealing members 10A and 10B prevent muddy water and the like from entering the bearing B and prevent lubricating grease from leaking.

The bearing B includes: an inner ring 11 having an inner ring raceway surface 11A formed on its outer peripheral surface; an outer ring 12 having an outer ring raceway surface 12A formed on its inner peripheral surface; and rolling elements 13 that are balls and roll between the inner ring raceway surface 11A and the outer ring raceway surface 12A. The inner ring 11, outer ring 12, and rolling elements 13 are made of iron.

In the wheel support bearing device A, since the magnetic encoder 1 is arranged in the inboard IB side of the seal member 10A (an outside of a sealed space of the bearing B), the magnetic encoder 1 is used in an environment exposed to an external atmosphere.

<Magnetic Encoder>

The magnetic encoder 1 shown in FIGS. 1 to 5 includes an annular support member 2 made of metal and an annular magnet member 3 made of a plastic magnet.

(Annular Support Member)

The annular support member 2 includes a cylindrical portion 4 fitting on the exterior of the inner ring 11 of the bearing B, and an outward flange portion 5 extending outward in the radial direction R from an end of the cylindrical portion 4 in the inboard IB side. The cylindrical portion 4 has a small-diameter portion 6 on the outboard OB side and a large-diameter portion 7 formed by enlarging a part of the cylindrical portion in the inboard IB side from the small-diameter portion 6. The small-diameter portion 6 is press-fitted to the inner ring 11 (see a fitting portion F in FIG. 2), so that an inner peripheral surface 6A of the small-diameter portion 6 comes into contact with an outer peripheral surface 11B of the inner ring 11. A diameter of the inner peripheral surface 6A of the small-diameter portion 6 is, for example, 40 mm to 100 mm.

The annular support member 2 is formed by pressing, for example, a stainless steel plate having a thickness of 0.6 mm.

(Annular Magnet Member)

The annular magnet member 3 is attached to a surface 5A, in the inboard IB side, of the outward flange portion 5 of the annular support member 2. The annular magnet member 3 is magnetized into multiple poles with N and S poles arranged at regular intervals in the circumferential direction, and is made of a magnetic material containing magnetic powder, a binder, and an additive, for example.

As the magnetic powder, ferrite magnetic powder such as strontium ferrite and barium ferrite, as well as rare earth magnetic powder such as neodymium and samarium, can be suitably used. As the binder, thermoplastic resin materials such as polyimide (PA6, PA12, PA612, etc.) and polyphenylene sulfide (PPS) can be suitably used. As the additive, organic additives such as carbon fiber, and inorganic additives such as glass beads, glass fibers, talc, mica, silicon nitride (ceramic), and crystalline (amorphous) silica can be suitably used.

The annular magnet member 3 has an inner-diameter side recessed portion 8 that is formed by depressing an inner part 3B, in the radial direction R, of an inboard-side surface 3A toward the outboard OB side. The annular magnet member 3 has a wraparound portion 9 that wraps around the annular support member 2 toward the outboard OB side to a stepped portion S between the small-diameter portion 6 and the large-diameter portion 7 of the cylindrical portion 4. An inner peripheral surface 9A of the wraparound portion 9, which is press-fitted to the inner ring 11 of the bearing B, protrudes more inward in the radial direction R than the inner peripheral surface 6A of the small-diameter portion 6 of the cylindrical portion 4.

The annular magnet member 3 is molded through insert molding in a state of being attached to the annular support member 2. In other words, the annular magnet member 3 is molded through the injection molding with, as an insert work, the annular support member 2 on which a thermosetting adhesive Q (see FIGS. 8A and 8B) is applied to a joint surface W with the annular magnet member 3.

Figure 3:
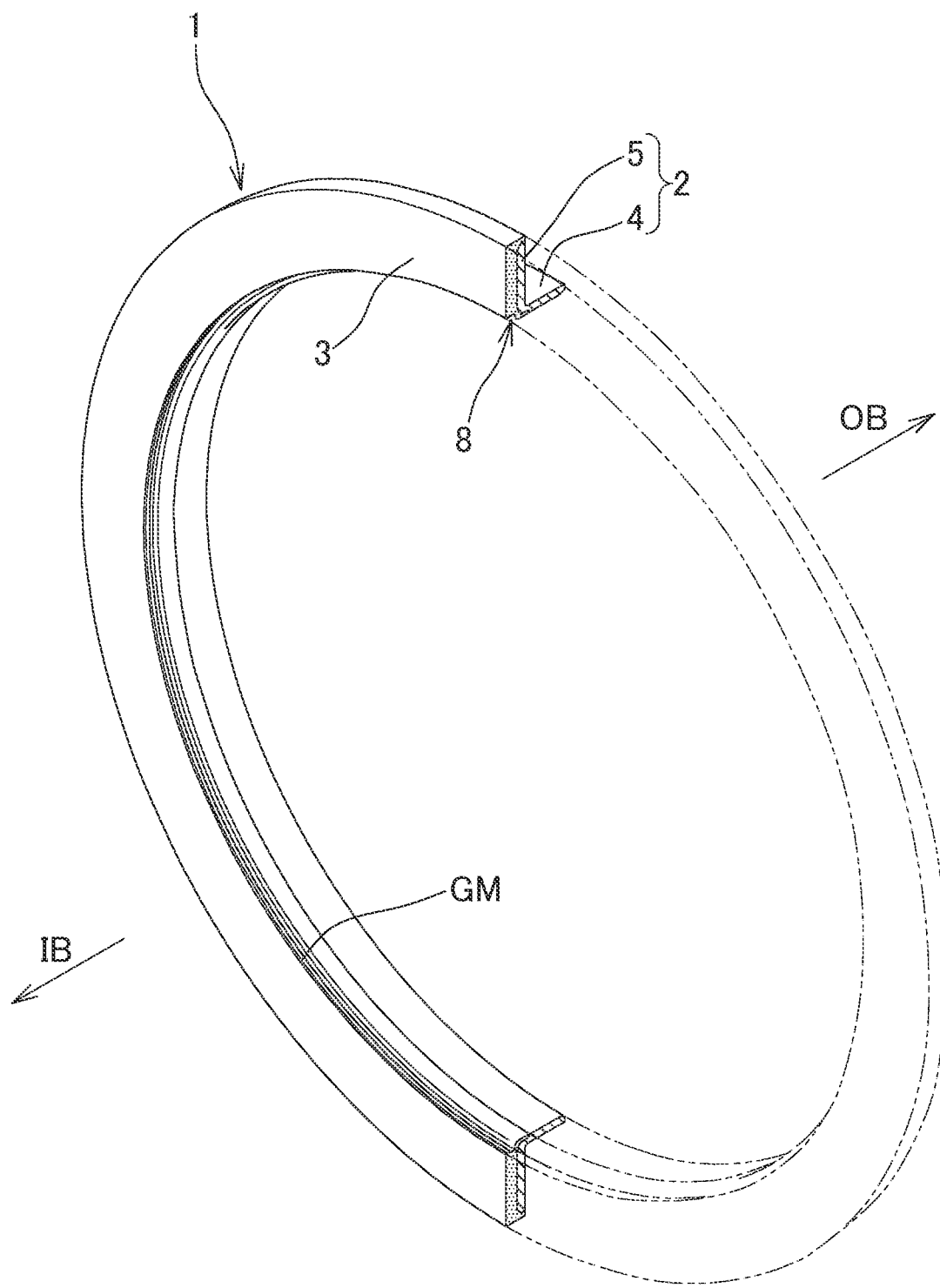
FIG. 3 is a perspective view with a partially cross-sectional view, showing the magnetic encoder.
Figure 4:
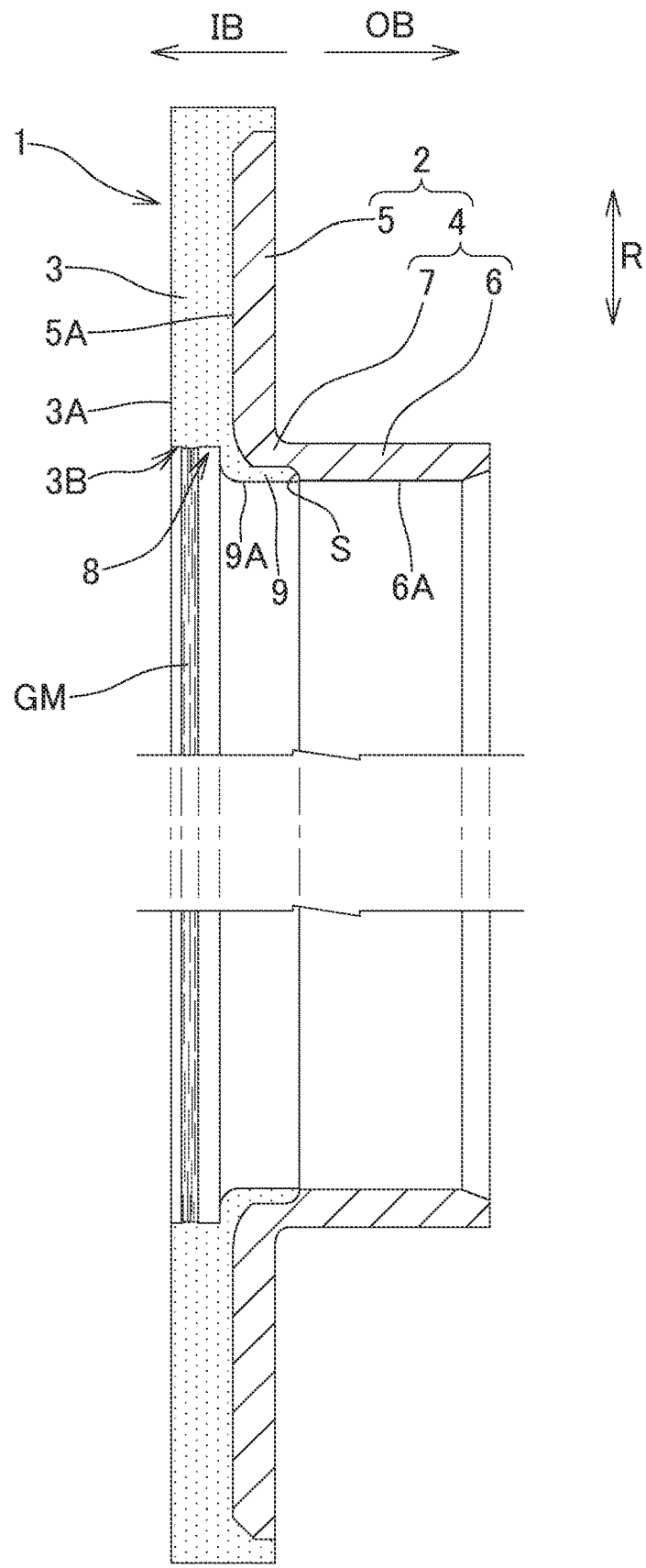
FIG. 4 is a vertical cross-sectional view of the magnetic encoder.
Figure 5:
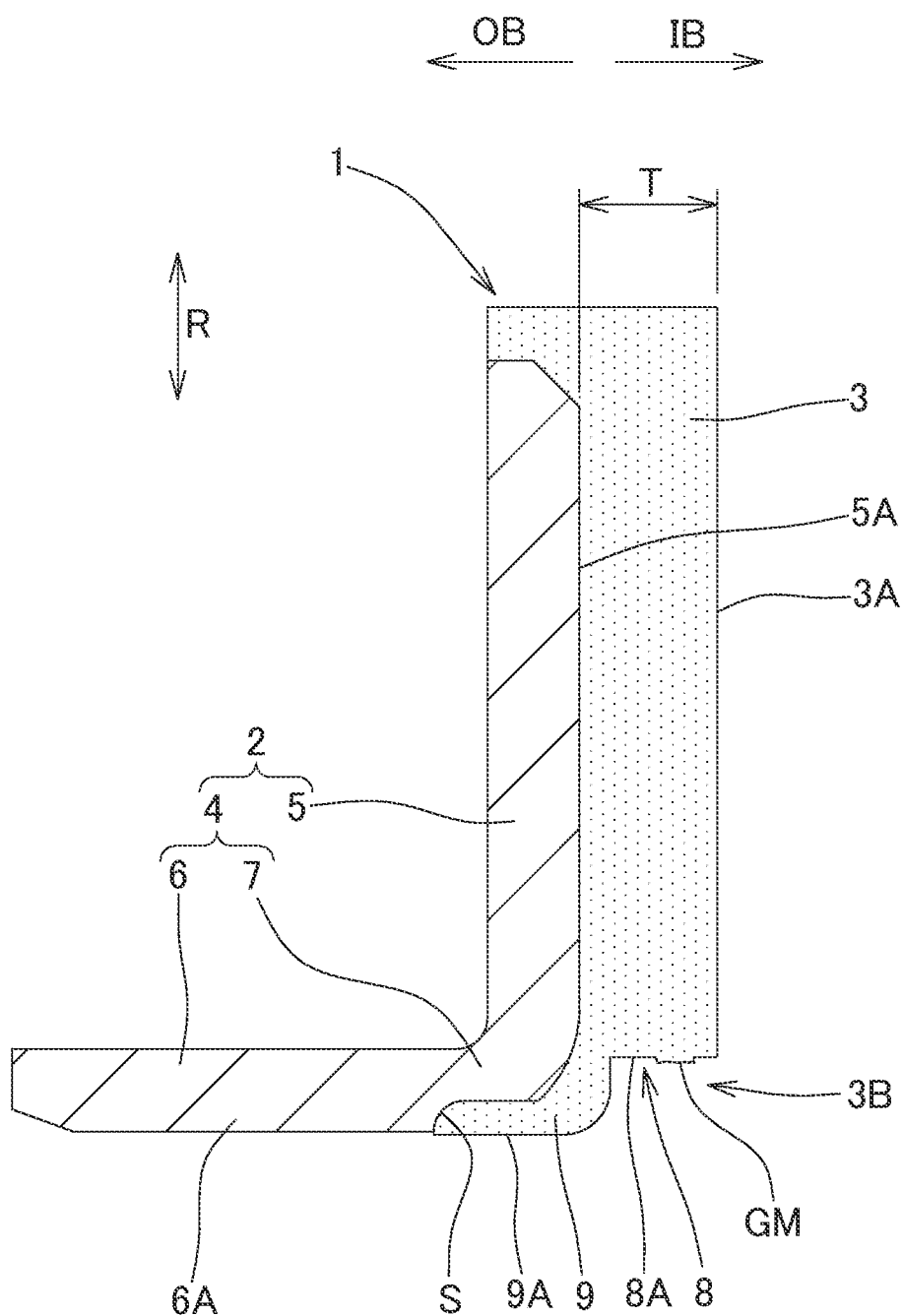
FIG. 5 is an end surface view of a cut portion of an enlarged main part in the magnetic encoder.

As shown in FIGS. 4 and 5, an inner peripheral surface 8A of the inner-diameter side recessed portion 8 of the annular magnet member 3 is cylindrical. As shown in FIGS. 3 to 5, the inner peripheral surface 8A of the inner-diameter side recessed portion 8 has a gate mark GM of an inner-diameter side disk gate G (see FIGS. 9 to 11).

Range of Dimension Around Inner-Diameter Side Recessed Portion

Figure 6:
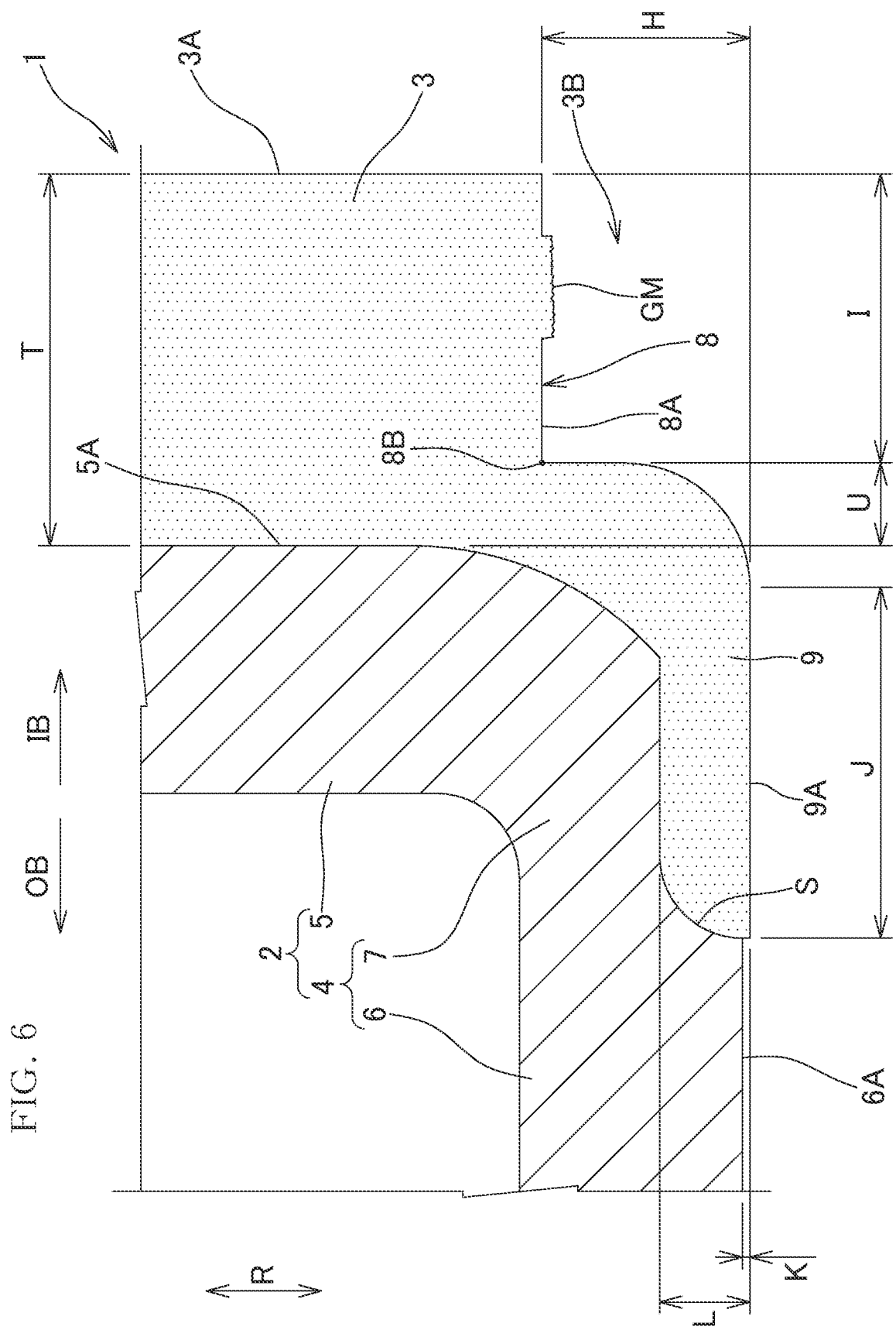
FIG. 6 is an enlarged view around an inner-diameter side recessed portion in FIG. 5.

In a preferred embodiment, a length H of the inner-diameter side recessed portion 8 in the radial direction R, shown in FIG. 6, is set to 0.05 mm≤H≤2 mm. In a case where H<0.05 mm, when the magnetic encoder 1 is incorporated into the inner ring 11 of the bearing B, the gate mark GM may come into contact with the inner ring 11 and contamination may occur. In a case where H>2 mm, a distance between the inner-diameter side disk gate G located on the inner peripheral surface 8A of the inner-diameter side recessed portion 8 and the wraparound portion 9 is increased. This makes it difficult for the molten resin to flow into the wrapping portion 9 during molding of the annular magnet member 3 through the injection molding.

In a preferred embodiment, a length I of the inner-diameter side recessed portion 8 in the axial direction, shown in FIG. 6, is set to I≥0.2 mm. In a case where I<0.2 mm, it becomes difficult to dispose the inner-diameter side disk date G.

In a preferred embodiment, an axial distance U between an end 8B, in the outboard OB side, of the inner peripheral surface 8A of the inner-diameter side recessed portion 8 and a surface 5A, in the inboard IB side, of the outward flange portion 5 of the annular support member 2, in FIG. 6, is set to U≥0.1 mm. In a case where U<0.1 mm, a flow path to the wraparound portion 9 is narrowed upon molding the annular magnet member 3 through injection molding. This makes it difficult for the molten resin to flow into the wraparound portion 9.

The axial length I and the axial distance U shown in FIG. 6 are expressed by I+U=T, where T is a thickness of the annular magnet member 3. When the thickness T of the annular magnet member 3 is determined and one of I and U is determined under the conditions of I≥0.2 mm and U≥0.1 mm, the other is also determined.

Range of Dimension Around Wraparound Portion

In a preferred embodiment, an axial length J of the inner peripheral surface 9A of the wraparound portion 9, shown in FIG. 6, is set to 0.2 mm≤J≤1.5 mm. In a case where J<0.2 mm, performance of preventing moisture from entering the fitting portion F (FIG. 2) may be degraded. In a case where J>1.5 mm, the wraparound portion 9, which is thin, becomes long, so that a molten resin less likely flows to the wraparound portion 9 when the annular magnet member 3 is molded through the injection molding.

In a preferred embodiment, a protrusion amount K of the inner peripheral surface 9A from the inner peripheral surface 6A, shown in FIG. 6, is set to 0<K≤0.1 mm. In a case where K≤0 (in a case where the inner peripheral surface 9A does not protrude from the inner peripheral surface 6A, i.e., the inner peripheral surface 9A is flush with the inner peripheral surface 6A, or an inner diameter of the inner peripheral surface 9A is larger than that of the inner peripheral surface 6A), the performance of preventing moisture from entering the fitting portion F (FIG. 2) may be degraded. In a case where K>0.1 mm, the annular magnet member 3 may be damaged upon incorporating the magnetic encoder 1 into the inner ring 11.

In a preferred embodiment, a thickness L of the wraparound portion 9 shown in FIG. 6 is set to 0.1 mm≤L≤0.4 mm. In a case where L<0.1 mm, it becomes difficult for the molten resin to flow into the wraparound portion 9 when the annular magnet member 3 is molded through the injection molding. In a case where L>0.4 mm, a thickness of the large-diameter portion 7 of the annular support member 2 is reduced to cause strength and rigidity to be lowered, so that the annular support member 2 may be deformed upon incorporating the magnetic encoder 1 into the inner ring 11.

<Manufacturing Method of Magnetic Encoder>

(Annular Support Member Molding Steps)

Figure 7:
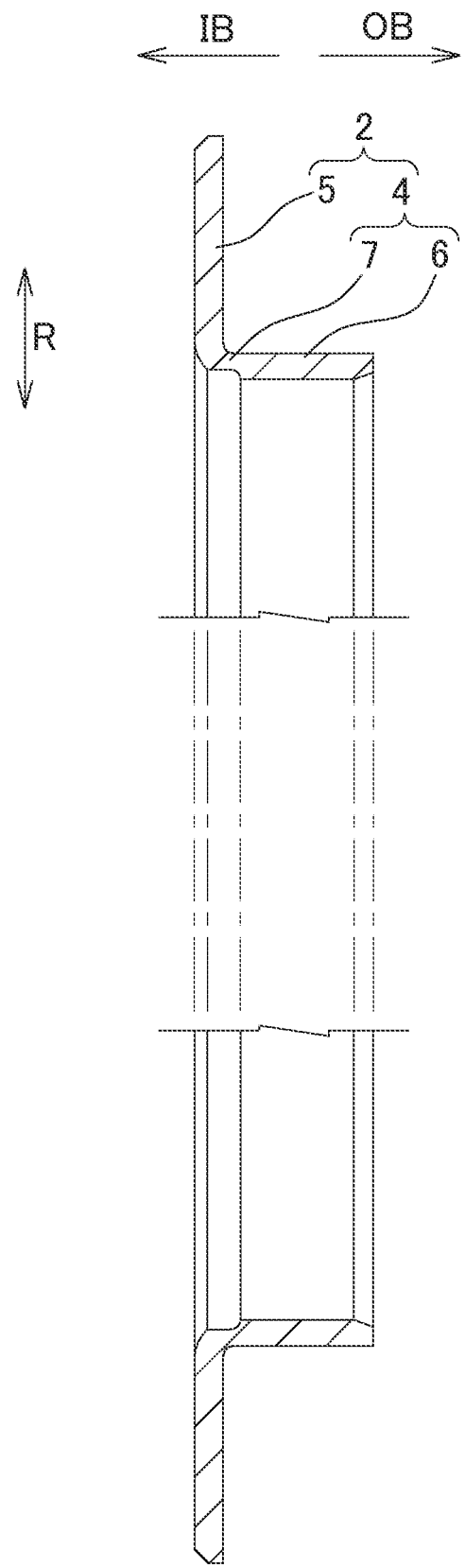
FIG. 7 is a cross-sectional view of an annular support member.

The annular support member 2 having a shape shown in FIG. 7 is molded by pressing only or pressing and cutting.

For example, a plate member made of stainless steel is subjected to punching, to obtain an annular shaped plate material. Subsequently, the annular shaped plate material is subjected to burring to mold the annular support member 2 having the large-diameter portion 7. Alternatively, the large-diameter portion 7 is provided by cutting, after the burring.

(Adhesive Application Steps)

Figure 8A:
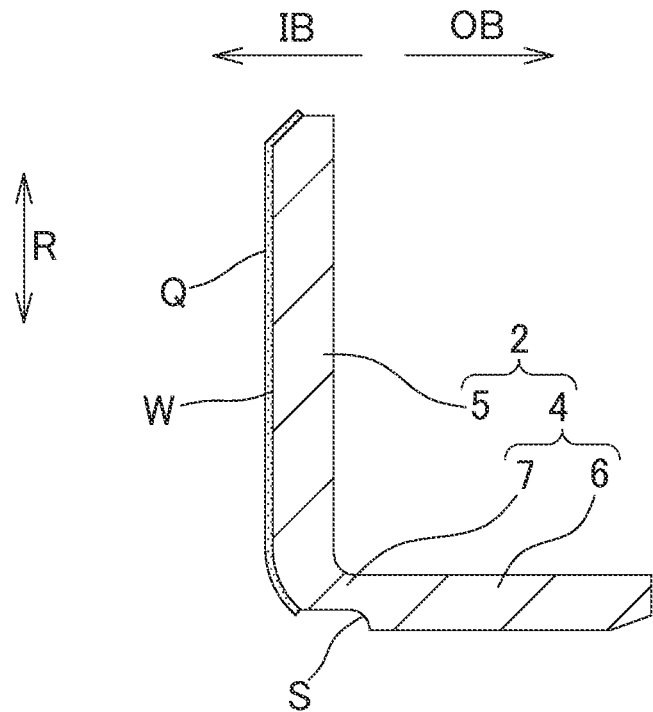
FIG. 8A is an end surface view of a cut portion of an enlarged main part in the annular support member, and shows an example of applying a thermosetting adhesive to a part of a joint surface with the annular magnet member.
Figure 8B:
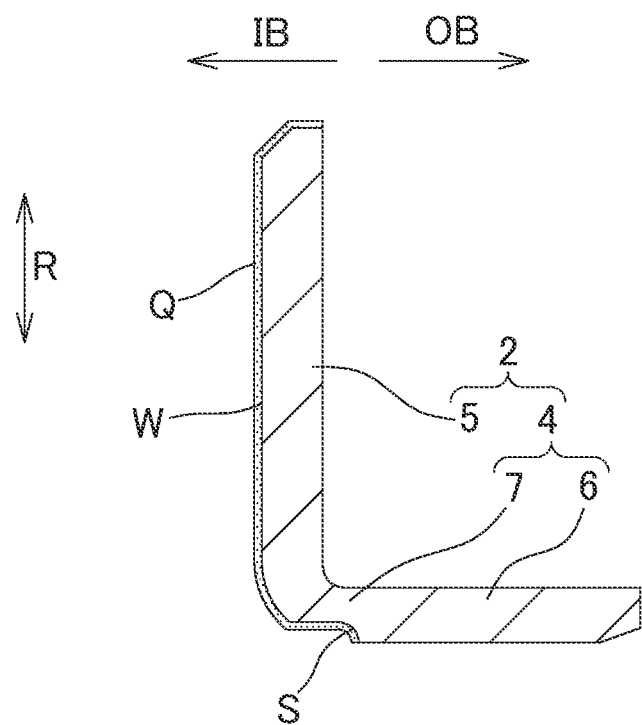
FIG. 8B is an end surface view of a cut portion of a main part in the annular support member, and shows a case of applying the thermosetting adhesive to an entirety of the joint surface with the annular magnet member.

Next, the thermosetting adhesive Q is applied to a predetermined area of the annular support member 2, which is an area shown in FIG. 8A or 8B, for example. The thermosetting adhesive Q includes, for example, a phenolic resin adhesive and an epoxy resin adhesive. In FIGS. 8A and 8B, a thickness of the adhesive Q is exaggerated from its actual thickness.

As shown in FIG. 8A, the thermosetting adhesive Q is applied to a part of a joint surface W of the molded annular support member 2 with the annular magnet member 3. Alternatively, as shown in FIG. 8B, the thermosetting adhesive Q is applied to the entirety of the joint surface W of the molded annular support member 2 with the annular magnet member 3.

For example, as shown in FIG. 8B, the adhesive Q is applied to a range from the inner peripheral surface of the large-diameter portion 7 to the stepped portion S, so that propagation of cracks in the resin of the wraparound portion 9 (see FIG. 4) can be delayed after the annular magnet member 3 has been molded through the injection molding. Accordingly, thermal shock resistance of the magnetic encoder 1 is improved.

(Annular Support Member Setting Steps)

Figure 9:
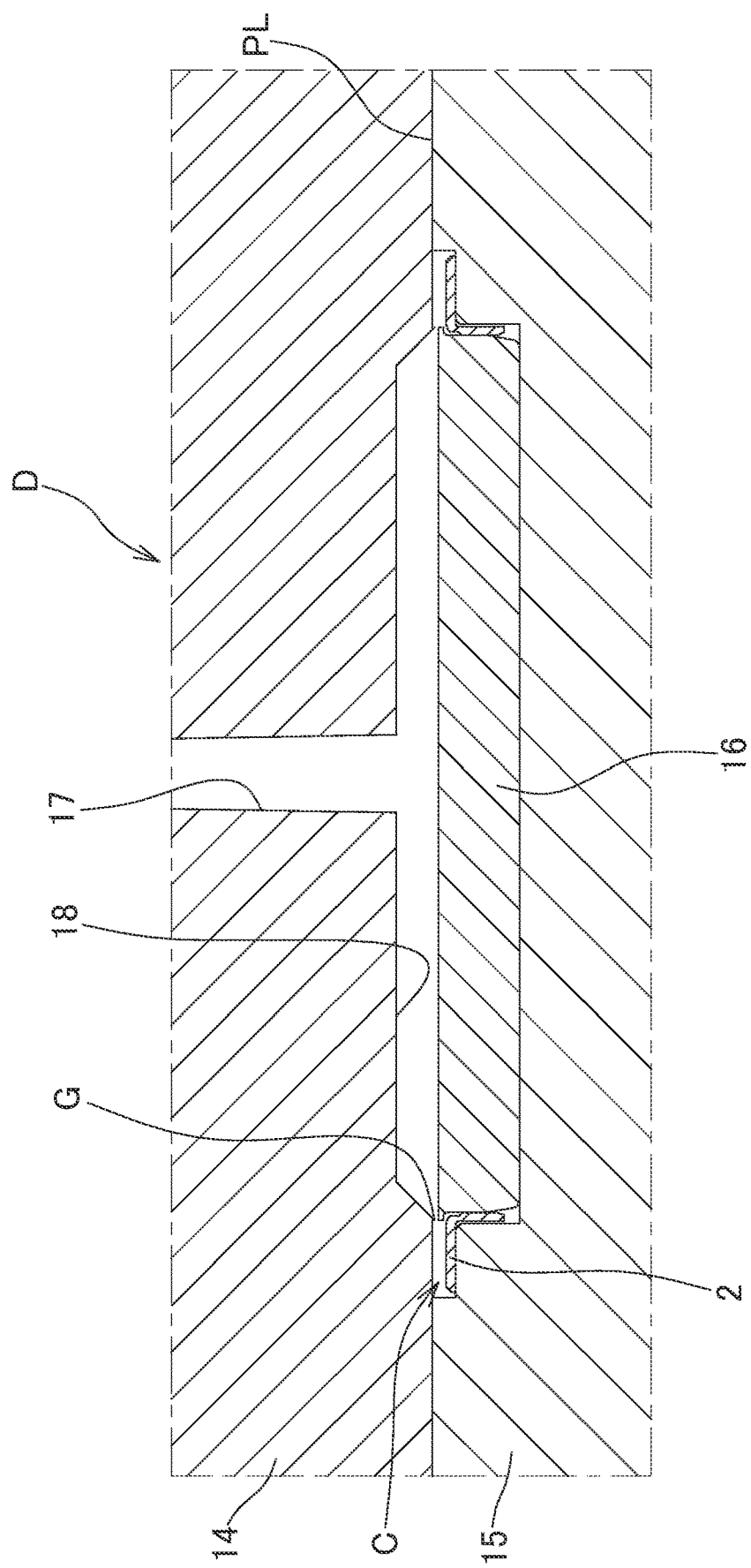
FIG. 9 is a schematic vertical cross-sectional view of an injection molding die, and shows a state before a molten resin is injected into a cavity.

Next, an injection molding die D shown in FIG. 9 is opened, and the annular support member 2, to which the thermosetting adhesive Q is applied, is set in the molding die D as an insert work.

Specifically, in FIG. 9, a movable core 15 is opened with respect to a fixed core 14, and a center core 16 is taken out.

In this state, the annular support member 2 is set on the movable core 15, and the center core 16 is placed in the movable core 15.

(Annular Magnet Member Molding Steps)

Next, the annular magnet member 3 is molded through the injection molding.

Figure 10:
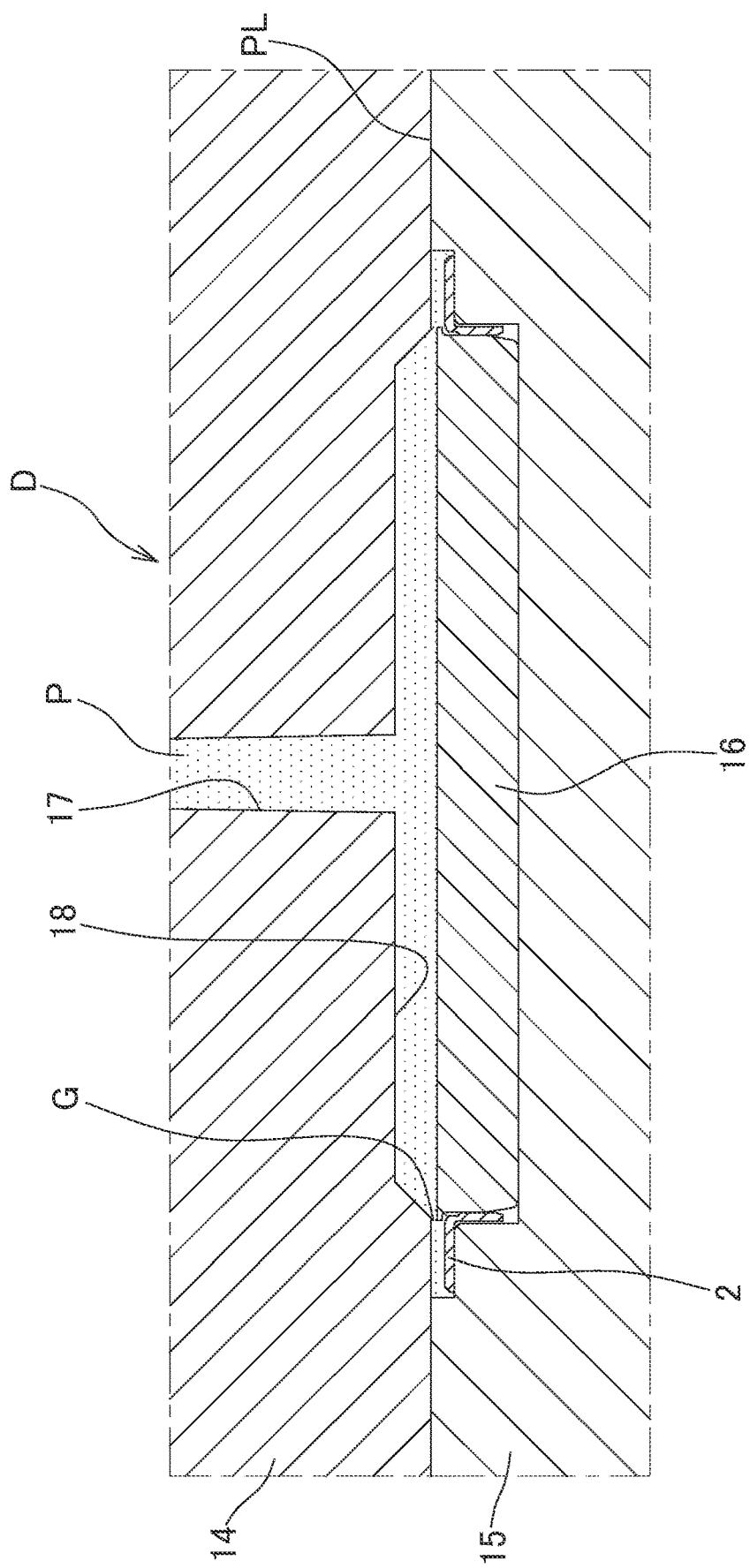
FIG. 10 is a schematic vertical cross-sectional view of the injection molding die, and shows a state where the molten resin is injected into the cavity.
Figure 11:
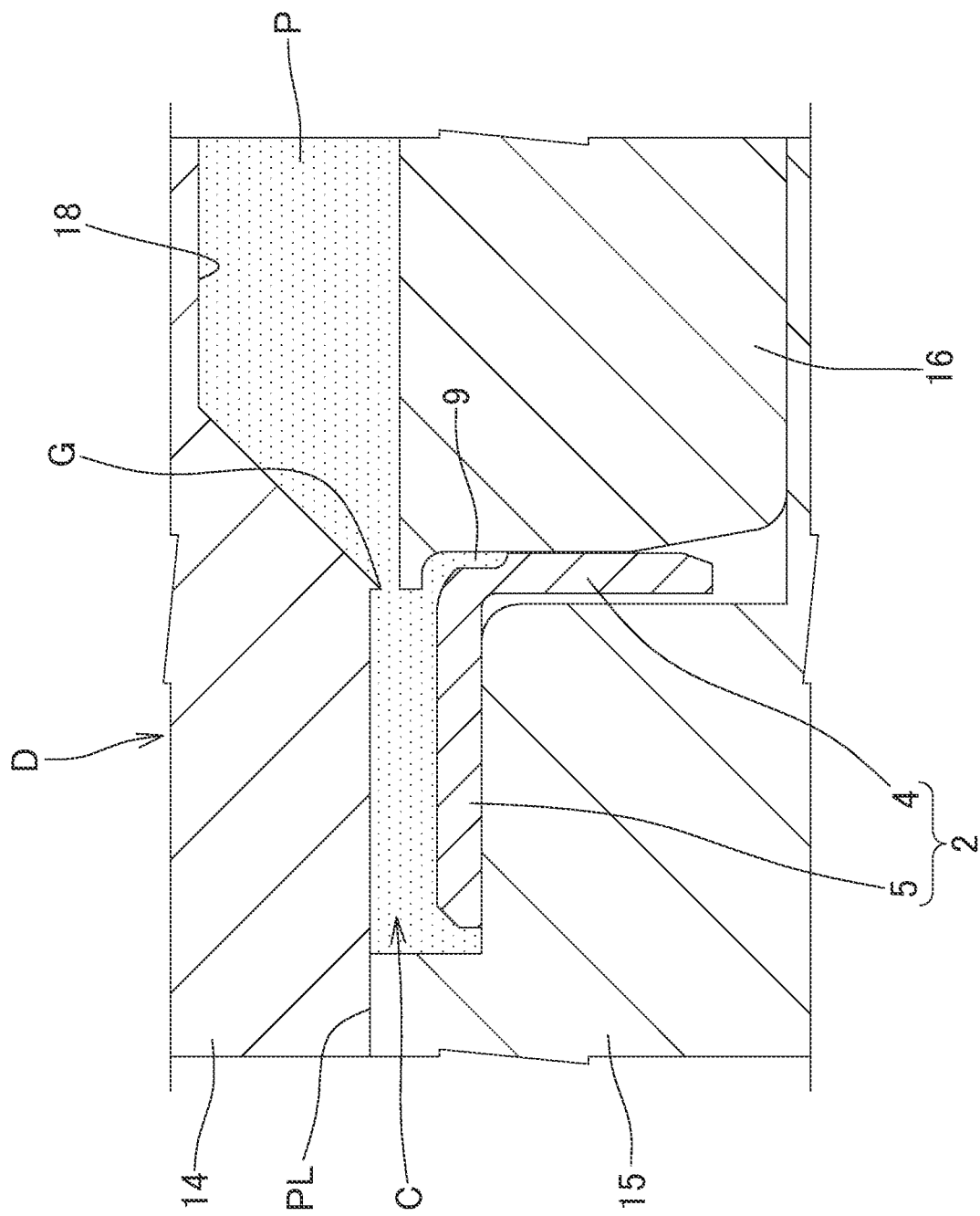
FIG. 11 is an enlarged view showing a main part of FIG. 10.

As shown in FIG. 9, the movable core 15 is closed with respect to the fixed core 14 and clamped. Subsequently, as shown in FIG. 10, the molten resin P is injected from a sprue 17. The molten resin P is injected into a cavity C of the molding die D from the inner-diameter side disk gate G of the molding die D, which is arranged at a position corresponding to the inner peripheral surface 8A (see FIG. 5) of the inner-diameter side recessed portion 8 of the annular magnet member 3, as shown in FIG. 11. Accordingly, the cavity C is filled with the molten resin P.

<Molded Article Taking-Out Steps>

After cooling and solidifying the molten resin P, the movable core 15 is opened from a parting line PL shown in FIGS. 10 and 11. Subsequently, a molded article before undergoing gate-cutting processing and the center core 16 are taken out by being projected with an ejector pin (not shown). Then, the gate-cutting processing is performed to separate the magnetic encoder 1 that is an insert-molded article, from a gate portion. In the magnetic encoder 1, as shown in FIGS. 3 to 5, there is the gate mark GM of the inner-diameter side disk gate G on the inner peripheral surface 8A of the inner-diameter side recessed portion 8.

(Magnetization Steps)

The annular magnet member 3 is magnetized to have multiple poles in the circumferential direction. In this magnetization, the injection molding is performed in a controlled magnetic field, for example, during the annular magnet member molding steps, thereby causing magnetic powder to be magnetically oriented. Alternatively, after the magnetic encoder 1 obtained in the molded article taking-out steps is demagnetized, a separately prepared magnetizing device such as a magnetizing yoke is used to perform magnetization so that N poles and S poles are alternately set in the circumferential direction of the annular magnet member 3.

Modified Example

The inner peripheral surface 8A of the inner-diameter side recessed portion 8 of the annular magnet member 3 in the above embodiment has a cylindrical surface shape as shown in FIG. 5, for example. The shape of the inner peripheral surface 8A of the inner-diameter side recessed portion 8 is not limited to cylindrical.

Figure 12:
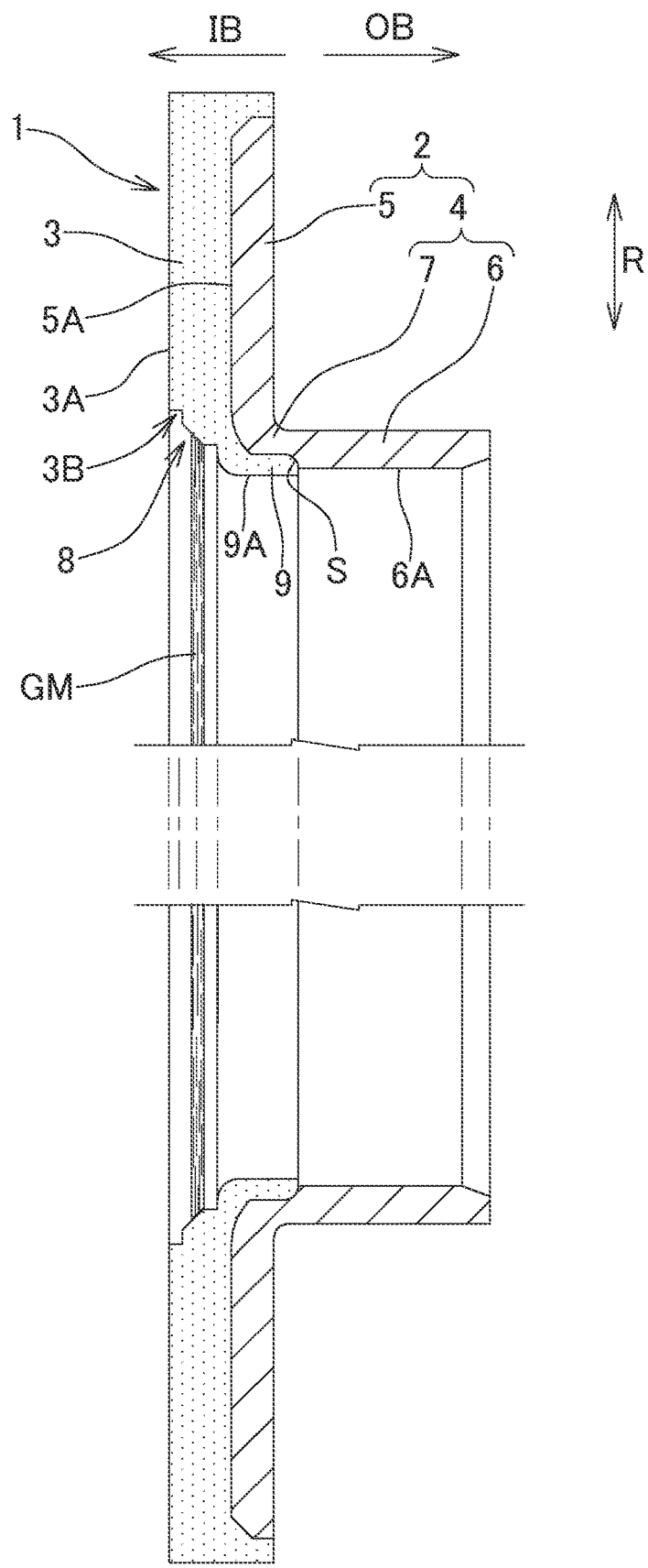
FIG. 12 is a vertical cross-sectional view of a modified example of the magnetic encoder.
Figure 13:
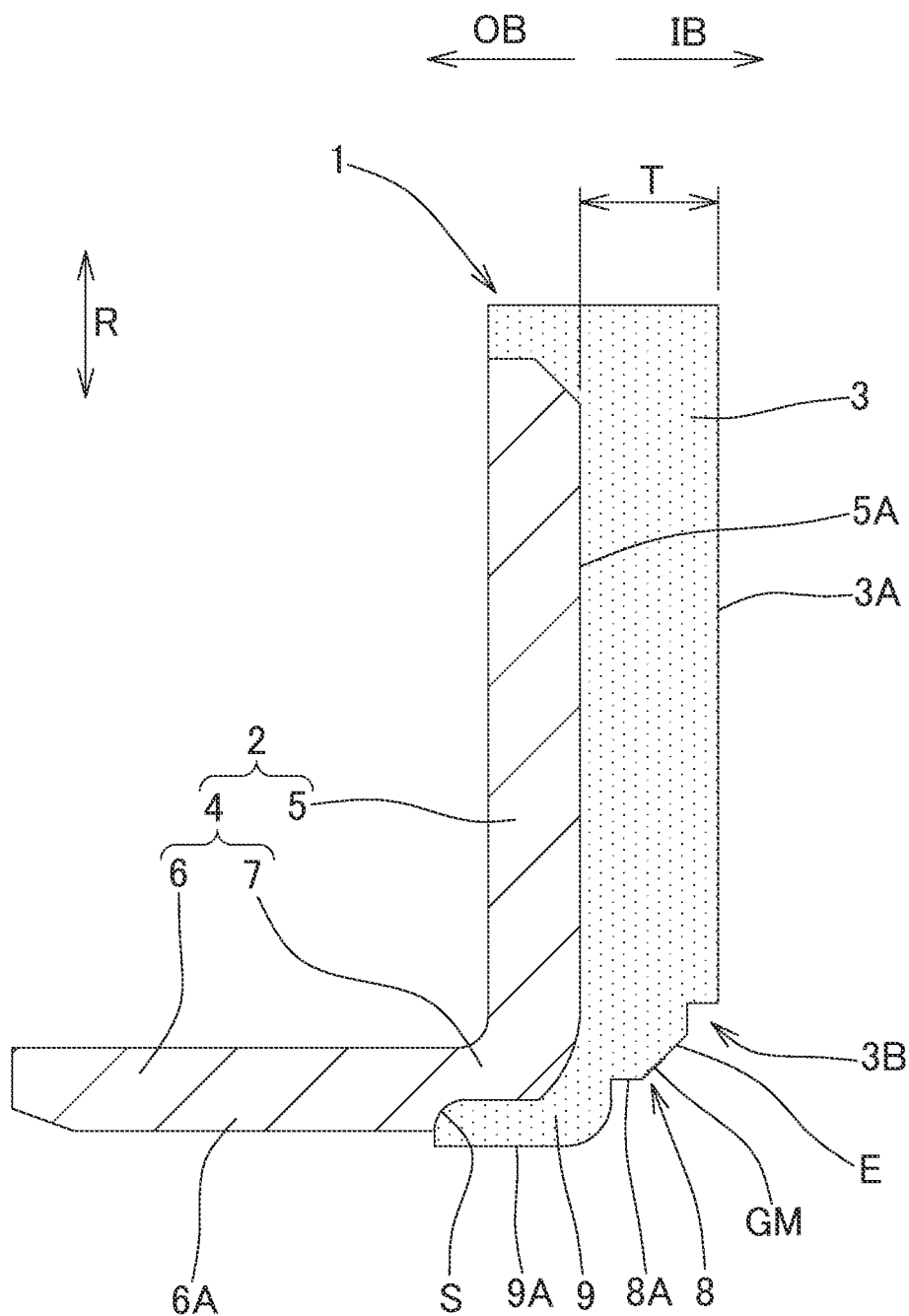
FIG. 13 is an end surface view of a cut portion of an enlarged main part in the modified example.

The inner peripheral surface 8A of the inner-diameter side recessed portion 8 may include an inclined surface E, as shown in FIGS. 12 and 13. The inclined surface E has a side surface shape of a truncated cone, which extends outward in the radial direction R as approaching the inboard IB side, and the inclined surface E has the gate mark GM.

(Range of Dimension Around the Inner-Diameter Side Recessed Portion)

Figure 14:
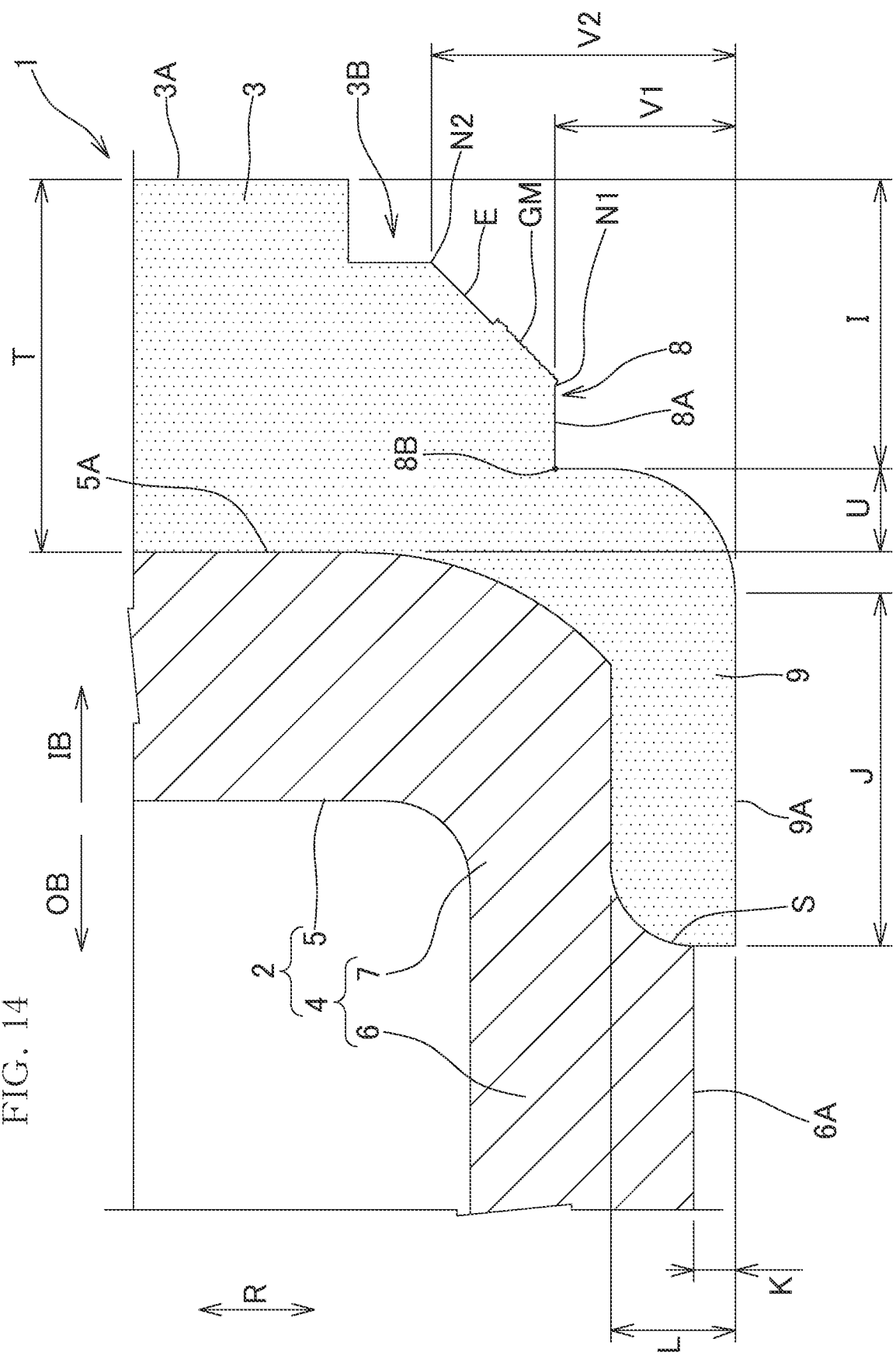
FIG. 14 is an enlarged view around an inner-diameter side recessed portion in FIG. 13.

In a preferable embodiment, a distance V1 in the radial direction R between the inner peripheral surface 9A of the wraparound portion 9 and the inner end portion N1 of the inclined surface E in the radial direction R, as shown in FIG. 14, is set to V1≥0.05 mm. In a case where V1<0.05 mm, the gate mark GM may come into contact with the inner ring 11 upon incorporation of the magnetic encoder 1 into the inner ring 11 of the bearing B. This may cause contamination to occur.

In a preferable embodiment, a distance V2 in the radial direction R between the inner peripheral surface 9A of the wraparound portion 9 and an outer end portion N2 of the inclined surface E in the radial direction R, as shown in FIG. 14, is set to V2≤2 mm. In a case where V2>2 mm, a distance between the wraparound portion 9 and the inner-diameter side disk gate G located on the inclined surface E of the inner peripheral surface 8A of the inner-diameter side recessed portion 8 increases, so that the molten resin hardly flows into the wraparound portion 9 upon molding the annular magnet member 3 through the injection molding.

In a preferable embodiment, an axial length I of the inner-diameter side recessed portion 8 and an axial distance U between the end 8B, in the outboard OB side, of the inner peripheral surface 8A of the inner-diameter side recessed portion 8 and the surface 5A in the inboard IB side of the outward flange portion of the annular support member 2, shown in FIG. 14, are set to I≥0.2 mm and U≥0.1 mm, respectively, from a point of view same as those for the axial length I and the axial distance U in FIG. 6.

(Range of Dimension Around Wraparound Portion)

In a preferred embodiment, an axial length J of the inner peripheral surface 9A of the wrapping portion 9 shown in FIG. 14 is set to 0.2 mm≤J≤1.5 mm, from a point of view same as that for the axial length J in FIG. 6. In a preferred embodiment, a protrusion amount K of the inner peripheral surface 9A from the inner peripheral surface 6A shown in FIG. 14 is set to 0<K≤0.1 mm from a point of view same as that for the protrusion amount K in FIG. 6. In a preferred embodiment, a thickness L of the wraparound portion 9 shown in FIG. 14 is 0.1 mm≤L≤0.4 mm from a point of view same as that for the thickness L in FIG. 6.

Examples of Injection Molding Die

An example of the injection molding die D for molding the annular magnet member 3 of the magnetic encoder 1 shown in FIG. 12 is shown in FIG. 15. In the annular magnet member molding steps, the inner-diameter side disk gate G of the injection molding die D for molding the annular magnet member 3 through the injection molding is arranged at a position corresponding to the inclined surface E (see FIG. 13) of the inner peripheral surface 8A of the inner-diameter side recessed portion 8 of the annular magnet member 3, as shown in FIG. 15.

Effects

In the magnetic encoder 1 according to the embodiments of the present invention, the inner portion 3B, in the radial direction R, of the surface 3A in the inboard IB side of the annular magnet member 3 has the inner-diameter side recessed portion 8, and the inner peripheral surface 8A of the inner-diameter side recessed portion 8 has the gate mark GM of the inner-diameter side disk gate G. In the method of manufacturing the magnetic encoder 1, according to the embodiment of the present invention, the inner-diameter side disk gate G for injecting the molten resin P into the cavity C of the injection molding die D upon the injection molding of the annular magnet member 3 is arranged at a position corresponding to the inner peripheral surface 8A of the inner-diameter side recessed portion 8.

Specifically, the inner-diameter side disk gate G of the injection molding die D is positioned near the wraparound portion 9 of the annular magnet member 3, which wraps around the annular support member 2 toward the outboard OB side to the stepped portion S between the small-diameter portion 6 and the large-diameter portion 7 of the cylindrical portion 4. This makes it easier for the molten resin P to flow from the inner-diameter side disk gate G to the thin wraparound portion 9, and stabilizes a filling state of the molten resin P in the wraparound portion 9. Accordingly, there is no defect such as a short shot on the inner peripheral surface 9A of the wraparound portion 9, which is in contact with the outer peripheral surface 11B of the inner ring 11 of the bearing B.

In the magnetic encoder 1 according to the present invention and the magnetic encoder 1 manufactured by the magnetic-encoder manufacturing method according to the present invention, the inner peripheral surface 9A of the wraparound portion 9 of the annular magnet member 3, which is press-fitted to the inner ring 11 of the bearing B, protrudes more inward in the radial direction R than the inner peripheral surface 6A of the small-diameter portion 6 of the cylindrical portion 4 of the annular support member 2. Therefore, the wraparound portion 9 of the annular magnet member 3 is securely press-fitted to the inner ring 11 of the bearing B. In addition, the inner peripheral surface 9A of the wraparound portion 9 does not suffer from defects such as short shots, as described above. Therefore, the performance of preventing moisture from entering the fitting portion F between the small-diameter portion 6 of the cylindrical portion 4 of the annular support member 2 of the magnetic encoder 1 and the inner ring 11 of the bearing B can be reliably maintained.

The above description of the embodiments are all examples, and thus the present invention is not limited thereto. Various modifications and changes may be made without departing from the scope of the invention.

The invention claimed is:

1. A magnetic encoder for use in a wheel support bearing device of an automobile, the magnetic encoder comprising:
   an annular support member made of metal; and
   an annular magnet member made of a plastic magnet,
   the annular support member includes:
      a cylindrical portion that fits on an exterior of an inner ring of a bearing of the wheel support bearing device; and
      an outward flange portion extending radially outward from an end portion of the cylindrical portion in an inboard side,
   the cylindrical portion has a small-diameter portion press-fitted to the inner ring of the bearing, and a large-diameter portion formed by enlarging a part of the cylindrical portion, the part being closer to the inboard side than the small-diameter portion,
   the annular magnet member is attached to a surface of the outward flange portion in the inboard side,
   the annular magnet member has an inner-diameter side recessed portion formed by depressing, toward an outboard side, a radially inner part in a surface, in the inboard side, of the annular magnet member, and a wraparound portion that wraps around the annular support member toward the outboard side to a stepped portion between the small-diameter portion and the large-diameter portion of the cylindrical portion,
   an inner peripheral surface of the wraparound portion protrudes more radially inward than the inner peripheral surface of the small-diameter portion, the inner peripheral surface of the wraparound portion being press-fitted to the inner ring,
   the inner peripheral surface of the inner-diameter side recessed portion has a gate mark of an inner diameter disk gate, and
   a portion of the inner peripheral surface of the inner-diameter side recessed portion lies between the wraparound portion of the annular magnet member and the gate mark.

2. A method of manufacturing a magnetic encoder for use in a wheel support bearing device of an automobile, wherein
   the magnetic encoder includes: an annular support member made of metal; and an annular magnet member made of a plastic magnet,
   the annular support member includes:
      a cylindrical portion that fits on an exterior of an inner ring of a bearing of the wheel support bearing device; and
      an outward flange portion extending radially outward from an end portion of the cylindrical portion in an inboard side,
   the cylindrical portion has a small-diameter portion press-fitted to the inner ring of the bearing, and a large-diameter portion formed by enlarging a part of the cylindrical portion, the part being closer to the inboard side than the small-diameter portion,
   the annular magnet member is attached to a surface of the outward flange portion in the inboard side,
   the annular magnet member has an inner-diameter side recessed portion formed by depressing, toward an outboard side, a radially inner part in a surface, in the inboard side, of the annular magnet member, and a wraparound portion that wraps around the annular support member toward the outboard side to a stepped portion between the small-diameter portion and the large-diameter portion of the cylindrical portion,
   an inner peripheral surface of the wraparound portion protrudes more radially inward than the inner peripheral surface of the small-diameter portion, the inner peripheral surface of the wraparound portion being press-fitted to the inner ring, and
   a portion of an inner peripheral surface of the inner-diameter side recessed portion lies between the wraparound portion and a gate mark formed in the inner peripheral surface of the inner-diameter side recessed portion,
   the method comprising:
   molding the annular support member by one of (i) pressing and (ii) the pressing and cutting;
      applying a thermosetting adhesive to a part of or an entire of a joint surface of the molded annular support member with the annular magnet member;
      opening an injection molding die and setting, in the injection molding die, the annular support member to which the thermosetting adhesive is applied, as an insert work; and
      closing the injection molding die, and injecting a molten resin in a cavity of the injection molding die from an inner-diameter side disk gate of the injection molding die, to thereby mold the annular magnet member, the inner-diameter side disk gate being arranged at a position corresponding to the gate mark of the annular magnet member.

* * * * *